United States Patent
Tertilt

[19]

[11] Patent Number: 5,875,709
[45] Date of Patent: Mar. 2, 1999

[54] ROUND BALER

[75] Inventor: Werner Tertilt, Marienfeld, Germany

[73] Assignee: Claas KGaA, Harsewinkel, Germany

[21] Appl. No.: 869,684

[22] Filed: Jun. 5, 1997

[30] Foreign Application Priority Data

Jun. 21, 1996 [DE] Germany ............... 196 24 718.7

[51] Int. Cl.$^6$ .................................................. A01F 15/07
[52] U.S. Cl. ........................................... 100/89; 56/341
[58] Field of Search ............................. 100/5, 87–89; 53/118, 587; 56/341

[56] References Cited

U.S. PATENT DOCUMENTS

| 4,288,971 | 9/1981 | McClure | 100/89 |
| 4,566,379 | 1/1986 | Decoene et al. | 100/89 |
| 4,662,275 | 5/1987 | Tertilt | 100/89 |
| 4,698,955 | 10/1987 | Wagstaff | 100/89 |
| 4,763,464 | 8/1988 | Mouret | 100/88 |
| 4,765,237 | 8/1988 | Vansteelant et al. | 100/89 |
| 4,765,238 | 8/1988 | De Busscher et al. | 100/89 |

FOREIGN PATENT DOCUMENTS

| 0161726 | 11/1985 | European Pat. Off. . | |
| 0264492 | 4/1988 | European Pat. Off. . | |
| 2656896 | 6/1978 | Germany | 100/89 |
| 3432265 | 3/1986 | Germany . | |

Primary Examiner—Stephen F. Gerrity
Attorney, Agent, or Firm—Michael J. Striker

[57] ABSTRACT

A round baler has a bale chamber, a plurality of bale forming elements which limit a periphery of the bale chamber so that a volume of the bale chamber can be increased during a formation of a bale by the bale forming elements, a common lever structure on which the bale forming elements are arranged, the lever structure formed as a turnable lever structure supports the bale forming elements so that at least one of the bale forming elements, when the lever structure is turned outwardly, still extends inwardly into a peripheral circle formed by the other of the bale forming elements.

13 Claims, 3 Drawing Sheets

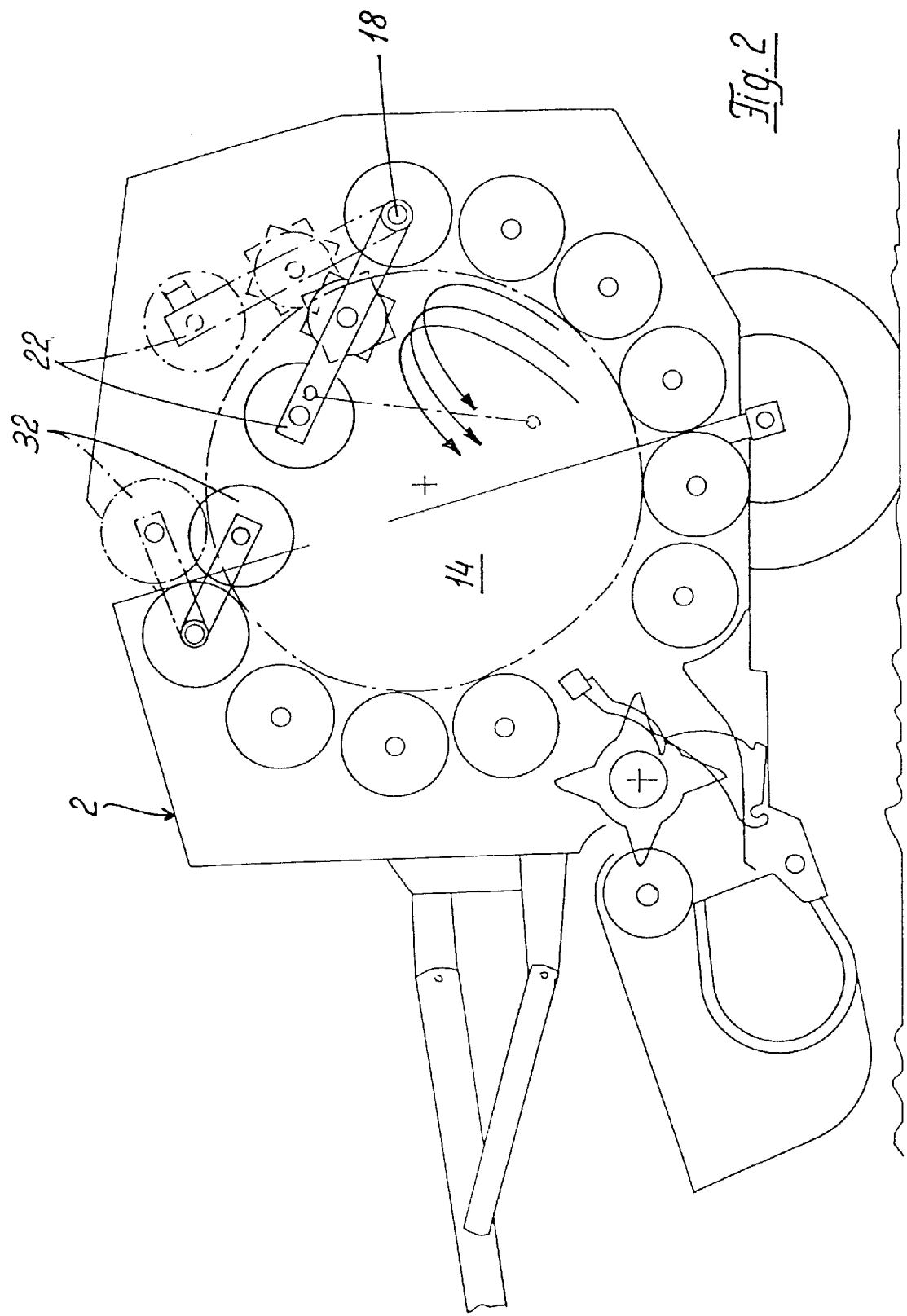

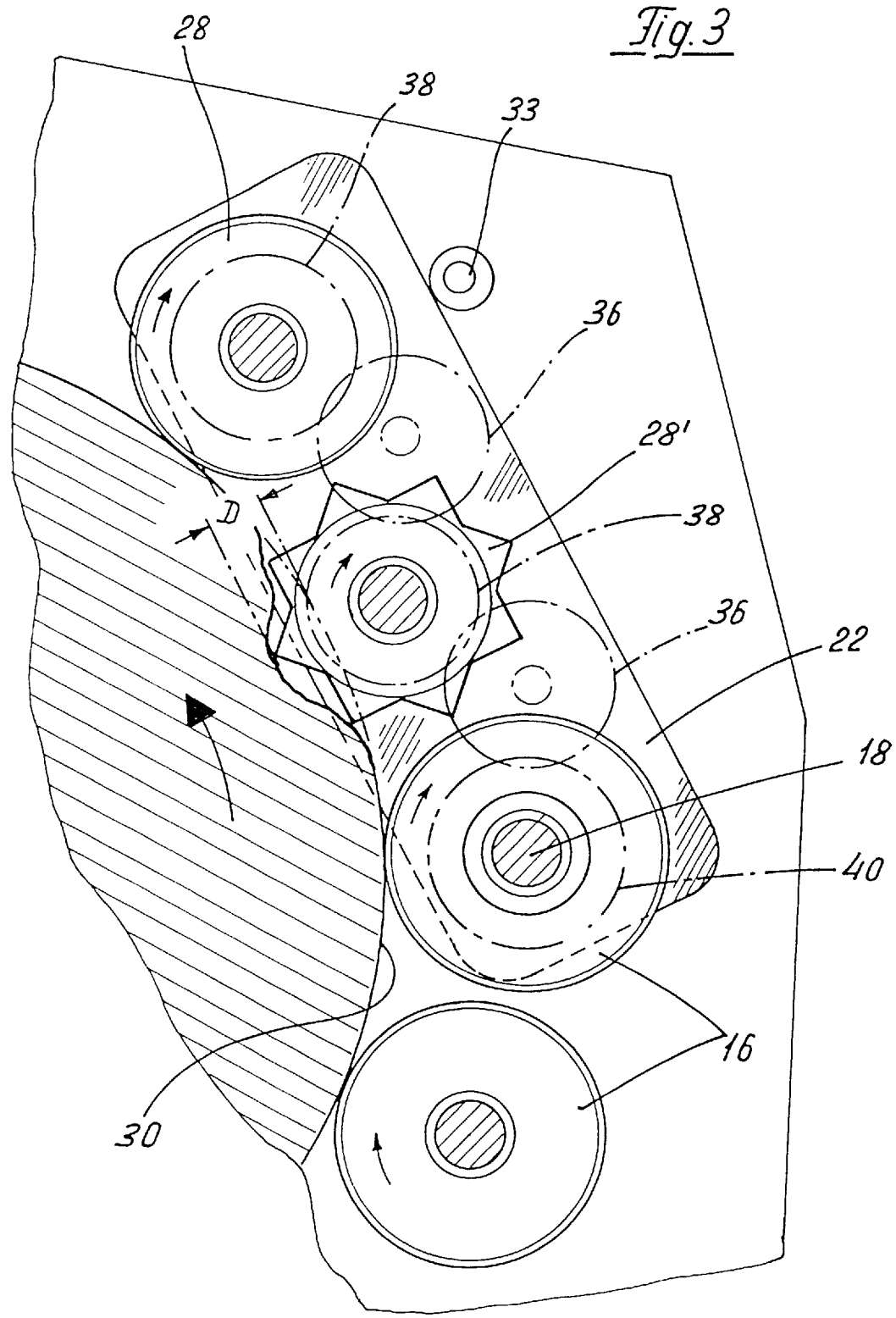

ROUND BALER

BACKGROUND OF THE INVENTION

The present invention relates to a round baler.

More particularly, the present invention relates to an agricultural round baler which has a bale chamber with a plurality of bale forming elements arranged on its periphery and forming a bale chamber space, arranged so that during the formation of a bale the volume of the baling chamber can be increased by the longitudinally displaceable bale forming elements jointly mounted on a longitudinally displaceable lever arm structure.

The balers of this type are known in the art. One of such balers is disclosed for example in the European patent document EP 0 161 726. The baler disclosed in this reference has stationary rollers formed as bale forming elements for a peripheral limiting of the bale chamber. However, this has the disadvantage that they form a bale core which is too soft, since the stationary elements at the beginning of the bale forming process can not apply a pressing force on a pressing product located in a bale chamber. It is proposed for the above described round baler to reduce the bale chamber by turning a group of rollers at the beginning of the bale forming process so as to apply a pressing force with the rollers at the beginning of the bale forming process to a pressing product located in the bale chamber. The supporting structure of the turnable roller group must have an arcuate contour, so that the position of the rollers with the fully turn-out roller group corresponds to the cylindrical shape of the final bale.

In constract, in the German patent document DE 34 32 265 it has been determined for a baler without a turnable-in roller group that it is advantageous for proper bale formation when the casing surface regions oriented toward the pressing chamber of the rollers located before the product inlet gap as seen in the bale turning direction have a small distance relative to the theoretical axis of rotation of the pressing chamber than the outer surfaces of the remaining rollers. Because of such narrowing of the bale chamber the bale is not broken in the inlet gap and remains in the round bale, and a partial strong compression of the bale is provided. Research has shown that in the round baler with roller groups which are supported turnably on an arcuate lever structure, with the radius of the arc substantially corresponding to the radius of the later finally formed bale, the bale formation in earlier stages of the bale forming is not sufficiently supported, since regardless of how many rollers are turned with arcuate lever structure, a radius remains which is substantially greater than the possible radius of the pressing product located at the beginning of the formation of a bale in the bale chamber. With such an arrangement the bale formation and the compression of the bale is not provided in an optimal manner.

In order to eliminate these advantages, it is proposed in the European patent document EP 0 264 492 to reduce the radius of the turnable arcuate roller group so that the roller group is turnable also additionally with a partial roller group mounted on a second arcuate lever structure. Such an arrangement is however expensive and susceptible to disturbances.

SUMMARY OF THE INVENTION

Accordingly, it is an object of the present invention to provide a round baler of the above mentioned general type which avoids the disadvantages of the prior art.

More particularly, it is an object of the present invention to provide the round baler with a turnable-in group of bale forming elements, which is improved to the support of the bale formation in an early bale forming phase and to obtain a maximum possible pressing density.

In keeping with these objects and with others which will become apparent hereinafter, one feature of the present invention resides, briefly stated in a baler in which several bale forming elements are supported on a lever structure so that at least one of the bale forming elements, with a fully outwardly turned lever structure, extends inwardly of a peripheral circle formed by the remaining bale forming elements.

With the arrangement of the bale forming elements on a straight lever structure, the bale forming elements are located inwardly relative to the arcuate lever structure, and the corresponding bale forming elements come in contact with the pressing product earlier and thereby can earlier press downwardly, which leads to an earlier rotation start of the forming bale. Also, the bale core has an improved compression value because of the earlier compacting action of the bale forming elements. When the bale forming elements supported on the straight lever structure are driven, the rotary movement of the bale forming elements can be transferred especially well to the pressed product bale, at the locations where the bale forming elements are located at the peripheral circle formed by the remaining bale forming elements, since there the contact with the bale forming elements is especially intensive.

In accordance with a further advantageous feature of the present invention, the straight lever structure is turnable about a rotary axis of a shaft of a stationary bale forming element. Moreover, the straight lever structure is loaded with a force from a force accumulator, which counteracts the turning-out movement, such as for example a spring, a hydraulic accumulator and the like. The force which counteracts the turning-out movement must be selected so that the straight lever structure achieves the highest turning-out position when the bale to be formed approximately reaches its nominal size. Thereby the force can be selected very high and the straight lever structure can deviate in a swingings manner against the force during the whole formation of the bale in the event of imbalance of the bale or volume differences of the supplied material. This eliminates peak loads of the corresponding components and improves their service life. Furthermore, in order to apply, at the end of the bale forming phase, a high pressure against the bale periphery, an abutment is provided and arranged so that the lever structure must not be movable beyond its end which limits the turning path.

In order to obtain the inventive action with different features, the longitudinal displaceable bale forming elements can be also supported on a peripheral circle of a lever structure which is curved in accordance with a cylindrical bale, and at least one bale forming element supported on the arcuate lever structure has a greater diameter than the other bale forming elements so as to extend inwardly in a peripheral circle formed by other bale forming elements. The bale forming elements supported on the curved lever structure can have the same diameter as other bale forming elements. The curvature of the lever structure is, however, selected so that with the fully outwardly turned lever structure at least one bale forming element supported on the curved lever structure extends inwardly into a peripheral circle formed by other bale forming elements. Also a combination of an arcuate lever structure and different diameters of bale forming elements, or a convex bending of the lever structure for earlier contact of the bale forming elements with the pressing product is possible.

In order to increase the pressing density of a round baler in accordance with the present invention, it is advantageous when one of the peripheral bale forming elements, in particular the one which is arranged not on the turnable lever structure, extends inwardly into the peripheral circle formed by the other bale forming elements. For increasing the transporting efficiency of this bale forming element extending inwardly, it is proposed to provide the same with a special transportation-efficient surface structure and/or shape. In order to provide also the high pressing density and transportation efficiency to the bale core, the bale forming element having the transportation-efficient surface structure and/or shape must be arranged on the turnable lever structure.

In order to increase the transportation action by the bale forming elements supported on the lever structure, it is especially advantageous when they have a special transportation-active surface structure such as for example a sanding or a similar coating and/or a surface formation, such as for example transportation-efficient raised portions, fingers, drivers and the like. Advantageously, a roller also has a star-shaped cross-section which is relatively inexpensive to produce. A maximum effect can be obtained when the first bale forming element, as considered in a bale turning direction, arranged on a turnable lever structure, is provided with such a special transportation-efficient surface structure and/or formation. This has the advantage that at the beginning of the bale formation process a pressing product which is loosely located in the bale chamber is transported by the inwardly turning lever structure against this bale forming element and immediately turned by it as early as possible to its transporting direction. Thereby it is possible to obtain a continuous product stream deviation to avoid product dam, loose material accumulations etc. The bale is therefore reliably wound at a very early phase of the bale formation.

The transporting action of the bale forming elements supported on the turnable lever structure is additionally increased when it is provided with a rotary drive. The rotation of the rotary drive can be transmitted through chains or toothed gears which are arranged for example in the turnable lever structure.

An optimal compression effect is obtained when at least one of the turnable lever structures, depending on the number of the longitudinally-displacable bale forming devices, is arranged substantially centrally to the further upper turnable rear flap. The less bale forming elements are located on the turnable lever structure, the farther downwardly can the turnable lever structure deviate. With such a positioning, an optimal spacial operational connection is provided between the bale forming elements on the turnable lever structure, the incoming product mat of the newly supplied pressing product, and the product stream of the previously supplied deviated pressing product which comes to lie on it. With the use of the gravity force, in such an arrangement the early bale formation and the rotation start of the bale core is provided.

For additionally reducing the bale chamber and covering holes which open because of the turning-in of the lever structure in the bale chamber, in addition to the bale forming elements supported on the lever structure, one or several further bale forming elements can be supported individually or in groups and arranged turnably into the peripheral circle formed by the remaining bale forming elements.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing a modification of the inventive baler, which is different from the solution shown in FIG. 1; and FIG. 3 is a detailed view of a portion of the inventive baler on an enlarged scale.

DESCRIPTION OF PREFERRED EMBODIMENTS

Figure 1:
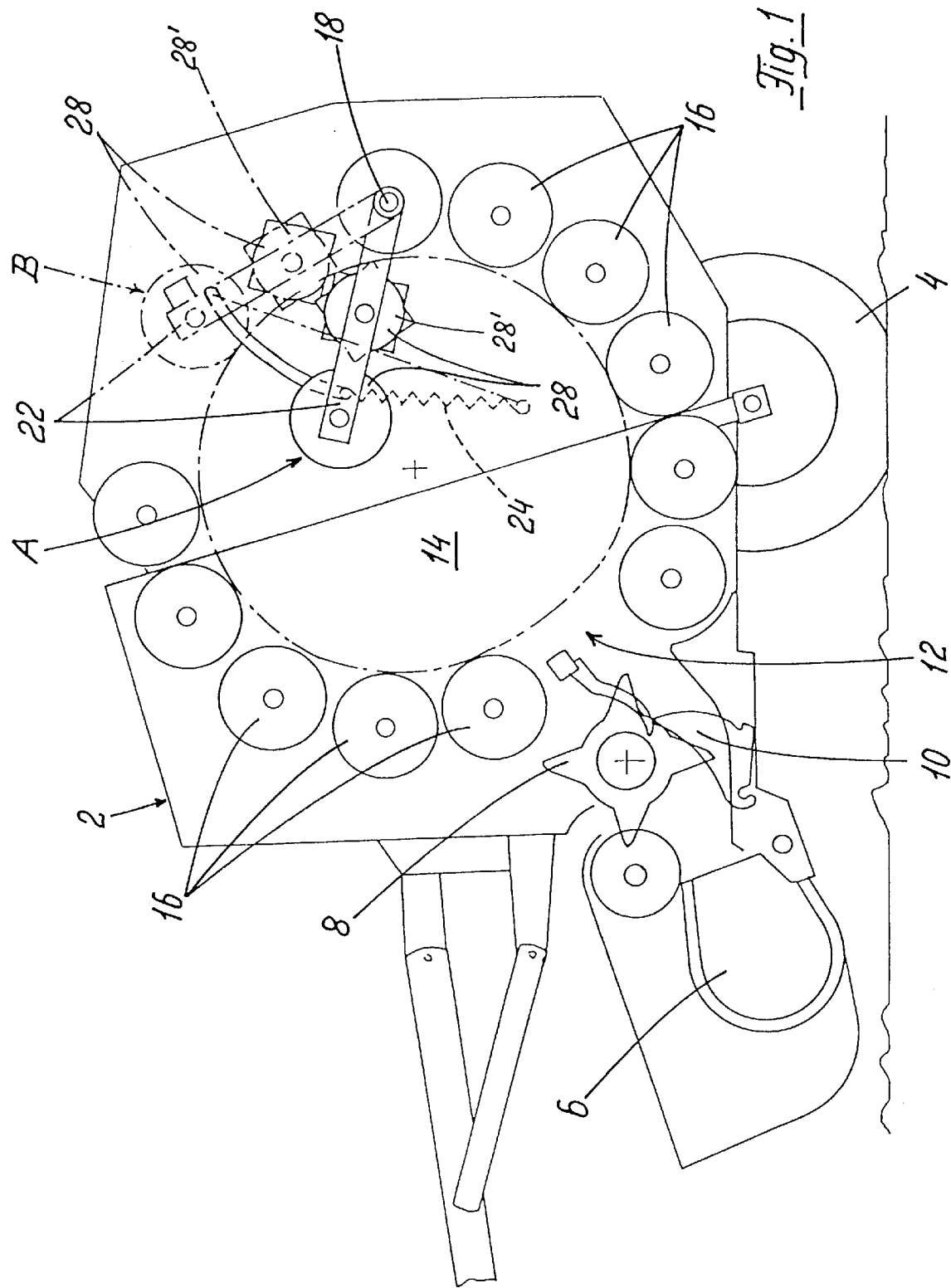
FIG. 1 is a side view of a round baler designed in accordance with the present invention.

FIG. 1 shows a round baler 2 in a side view and in a cross-section. The round baler 2 stands on wheels 4 and is moved over a field being suspended on a not shown tractor. The round baler 2 takes a pressing product from ground by a receiving device 6 and transports it through an eventually available cutting device composed of a cutting rotor 8 and cutters 10, into a supply opening 12 of a bale chamber 14. The bale chamber 14 is limited on its periphery by bale forming elements 16 which are formed here as cylindrical rollers.

A twist-resistant lever structure 22 is turnably supported on an axle or shaft 18 of one bale forming element 16 at a substantially medium height in a turnable rear flap of the bale press 2 and loaded with a force of a spring 24. Bale forming elements 28 are rotatably and drivingly supported in the lever structure 22. The bale forming elements 28 can have a smaller diameter than the bale forming element 16 or a same or greater diameter. The bale forming elements 16 and 28 are driven rotatably by a drive force.

The pressing product transported into the supply opening 12 is further transported by the rotary movement of the bale forming elements 16 to the bale forming elements 28, which at the beginning of the bale formation deviate by the turned-in lever structure 22 the transporting path of the pressing product, and the pressing product is transported back substantially in direction of the supply opening 12. The return transporting action is identified in FIG. 2 by three directional arrows. The newly supplied pressing product is located in the region of the supply opening, it is partially mixed, then taken up and transported against the bale forming elements 28, from which it is transported in direction of the inlet opening 12 and further until a sufficiently great pressing product quantity is accumulated to lift the lever structure 22 against the force of the spring 24. With the early abutment of a deviated product layer on a newly supplied product layer, the winding process and the rotary movement of the bale core can start very early.

The return transportation action of the bale forming elements 28 arranged on the lever structure 22 is supported by the aggressive design of the peripheral side of the bale forming elements 28'. The position of the lever structure 22 displaces more and more with the increasing pressing product quantity from the position A to the outermost turning-out position B. It is ideal when the lever structure 22 first reaches the outermost turning-out position B when the bale is completely or at least completely finished. For limiting the turning-out movement of the lever structure 22, an abutment 33 is provided so that in the end phase of the bale formation it activates a high pressing force against the bale. Since the bale forming elements 28 are arranged on a straight lever structure 22, at the beginning of the bale formation they can earlier deviate the pressing product and transport it back, and the deviation bend is greater than in the event of an arcuate arrangement. Thereby when insignificantly greater precompression of the pressing product is desired, the bale forming chamber is in this zone smaller, and the last bale forming element 28 arranged on the lever structure 22 can provide a sufficient space for abutment and partial mixing of the backwardly supplied pressing product with the newly supplied pressing product, since it does not extend in the mixing zone.

In the outermost turning-out position B the axle 18 of the bale forming element 28' which follows in a rotation direction extends with its outer periphery into a peripheral circle 30 formed by the remaining bale forming element 16, inwardly by a distance D. Thereby the bale forming element 28' can apply an additional pressure on the bale also when the lever structure 22 is located in the outermost turning-out position B, to obtain an especially high pressing density. During ejection of the bale through an open tailsate the bale forming element 22 loaded with the spring force can deliver to the bale an additional ejection pulse which follows the spring force, during subsequent turning of the lever structure 22. The bale forming element 32 shown in FIG. 2 is additionally turnable supported to maintain the opening as small as possible.

In FIG. 3 the bale forming elements 28, 28' are rotatably supported in the lever structure 22. The lever structure 22 is located in its outermost turned position and supported against the abutment 33. It can be easily seen how in this maximum turning-out position the periphery of the bale forming element 28' extends inwardly into the peripheral circle 30 of the bale formed by the other bale forming elements by the distance D. Due to the star-shaped design of the periphery of the bale forming element 28' the rotatable bale obtains the compressing pulse by the star tips to provide an especially compressed, weather-resistant and transportable outer skin. In addition to the transporting element 28, 28,' toothed gears 36 are arranged in the lever structure 22. They engage with toothed gears 38 which are non-rotatably connected with the shafts of the bale forming elements 28, 28'. Therefore the drive energy is transmitted from the toothed gear 40, which is non rotatably-connected with an axle end 18, to the bale forming elements 28, 28' in space-economical and cost-reducing manner.

In accordance with the invention some additional modifications are possible. For example, the bale forming elements 28 can be formed not only as cylindrical rollers, but instead also as bars or bands or similar means which extend in a corresponding peripheral line along in the peripheral circle 30 and are guided on the drive means, for limiting a bale chamber. Also, in addition to the utilization of the present invention in a so-called fixed chamber round baler, the inventive idea also can be used in a round baler with a variable bale chamber. It is also advantageous when more bale forming elements or different bale forming elements than the shown bale forming elements 28 are arranged on a turnable lever structure 22.

It will be understood that each of the elements described above, or two or more together, may also find a useful application in other types of constructions differing from the types described above.

While the invention has been illustrated and described as embodied in round baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A round baler, comprising means forming a bale chamber; a plurality of bale forming elements which limit a periphery of said bale chamber so that a volume of said bale chamber can be increased during a formation of a bale by said bale forming elements; a common lever structure on which said bale forming elements are arranged, said lever structure being formed as a turnable lever structure supporting said bale forming elements so that at least one of said bale forming elements, when said lever structure is turned outwardly, still extends inwardly into a peripheral circle formed by the other of said bale forming elements.

2. A round baler as defined in claim 1, wherein at least one bale forming element is stationarily arranged on a shaft, said lever structure being straight and turnably supported about a rotary axis of said shaft.

3. A round baler as defined in claim 2; and further comprising means for applying a force to said lever structure to counteract an outward turning movement of said lever structure.

4. A round baler as defined in claim 3, wherein said force which counteracts the turning-out movement is selected so that said lever structure achieves a maximum turning-out position when a bale to be formed approaches its nominal value.

5. A round baler as defined in claim 1, wherein in addition to said bale forming elements, additional bale forming elements are arranged on said lever structure in groups and are turnable into said peripheral circle formed by said remaining bale forming elements.

6. A baler, comprising means forming a bale chamber; a plurality of bale forming elements which limit said bale chamber over a periphery of said bale chamber so that a volume of said bale chamber is increased during formation of a bale by said bale forming elements; a common lever structure on which said bale forming elements are arranged, at least one of said bale forming elements extending inwardly in a peripheral circle formed by the other of said bale forming elements and is provided with transportation-active means.

7. A round baler as defined in claim 6, wherein said transportation-active means is formed as a surface structure on said at least one bale forming element.

8. A round baler as defined in claim 6, wherein said transportation-active means is formed as a formation provided on an outer surface of said at least one bale forming element.

9. A round baler as defined in claim 6, wherein at least another bale forming element is provided with said transportation-active means.

10. A round baler as defined in claim 6, wherein said at least one bale forming element is a first bale forming element arranged on said lever structure as considered in a bale turning direction.

11. A round baler as defined in claim 6, wherein at least one of said bale forming elements is drivingly arranged on said lever structure, and said lever structure is turnable.

12. A round baler as defined in claim 6; and further comprising a turnable tailgate, said lever structure being turnably supported substantially centrally in said turnable tailgate.

13. A round baler as defined in claim 6, wherein in addition to said at least one bale forming element, at least another bale forming element is supported on said lever structure and turnable into said peripheral circle formed by the remaining bale forming elements.

* * * * *